M. P. RAINEY.
CATTLE GUARD.
APPLICATION FILED OCT. 10, 1912.
1,059,393.
Patented Apr. 22, 1913.
2 SHEETS—SHEET 1.
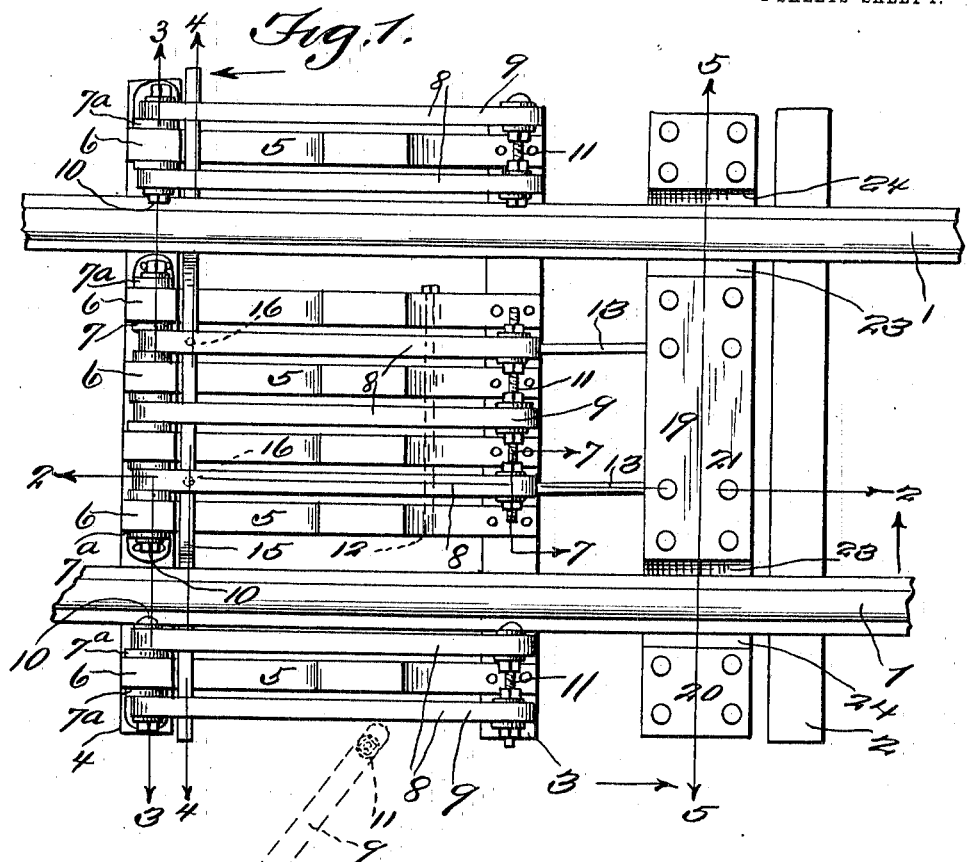
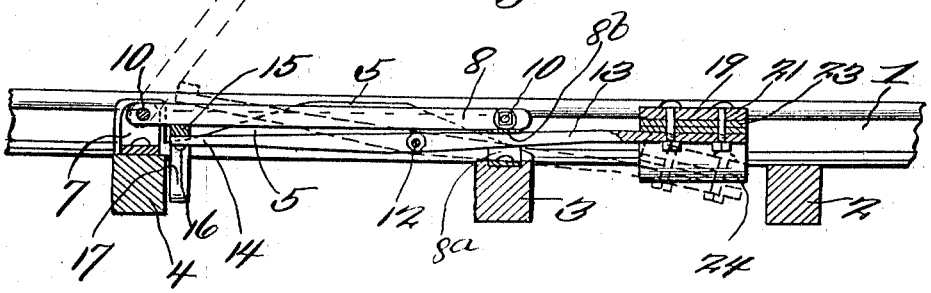
Witnesses
Robt. Meyer
Francis T. Boswell
Inventor
M. P. Rainey,
By Swift & Co.
his Attorneys M. P. RAINEY.
CATTLE GUARD.
APPLICATION FILED OCT. 10, 1912.
1,059,393.
Patented Apr. 22, 1913.
2 SHEETS—SHEET 2.
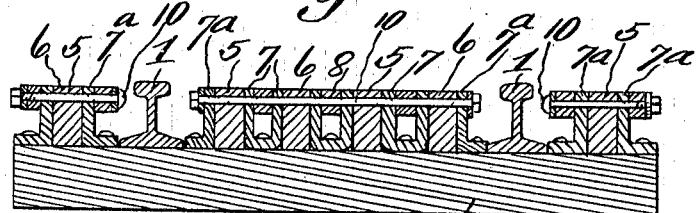
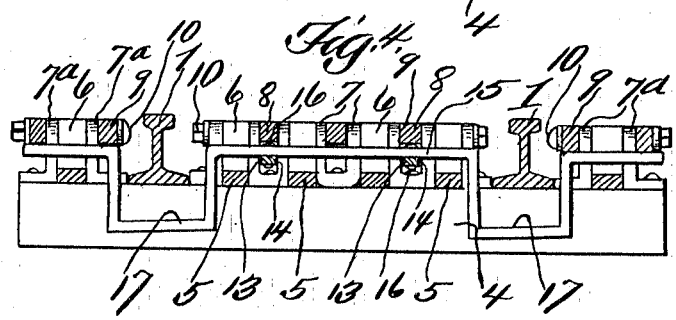
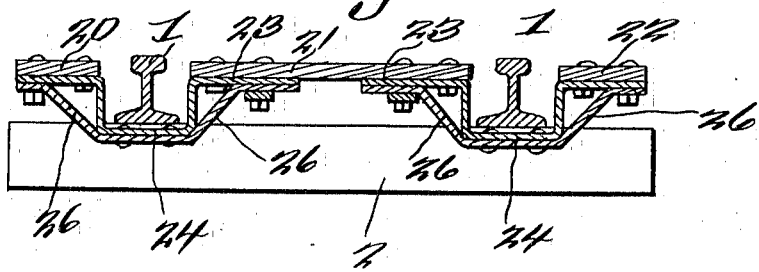
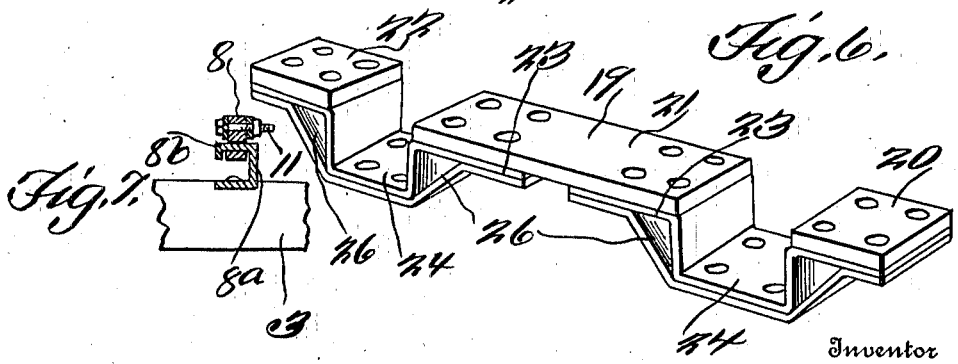
Witnesses
Rohe Meyer
Francis P. Boswell
Inventor
M. P. Rainey,
By D. Swift & Co.
his Attorneys

UNITED STATES PATENT OFFICE.

MATHEW PHILEMON RAINEY, OF HOLDENVILLE, OKLAHOMA.

CATTLE-GUARD.

1,059,393.  Specification of Letters Patent. Patented Apr. 22, 1913.

Application filed October 10, 1912. Serial No. 725,063.

*To all whom it may concern:*

Be it known that I, MATHEW PHILEMON RAINEY, a citizen of the United States, residing at Holdenville, in the county of Hughes and State of Oklahoma, have invented a new and useful Cattle-Guard; and I do hereby declare the following to be a full, clear, and exact description of the invention, such as will enable others skilled in the art to which it appertains to make and use the same.

This invention relates to a new and useful cattle guard, for railway crossings.

As one of the objects of the invention, it is the aim to construct an improved cattle guard, including an improved pedal mechanism, which when pressure is applied thereon, will automatically actuate a series of guard pickets, so as to throw them upwardly in the face of the animal, thereby preventing him passing along the track. The throwing of the picket guards upwardly, not only prevents the animal from passing, but also tends to frighten him.

One of the features of the improved cattle guard, is the provision of U-shaped brackets and spacing blocks for the pickets of the guard member.

Another feature of the invention is the particular arrangement and detail structure of the pedal, for actuating the guards.

The invention comprises further features and combination of parts, as hereinafter set forth, shown in the drawings and claimed.

In the drawings:—Figure 1 is a plan view of the improved cattle guard. Fig. 2 is a longitudinal sectional view on line 2—2 of Fig. 1, showing in dotted lines the improved picket guard members thrown upwardly Fig. 3 is a cross sectional view on line 3—3 of Fig. 1. Fig. 4 is a cross sectional view on line 4—4 of Fig. 1. Fig. 5 is a sectional view through the treadle on line 5—5 of Fig. 1. Fig. 6 is a detail view. Fig. 7 is a detail sectional view on line 7—7 of Fig. 1.

Referring more particularly to the drawings 1 designates the rails, while 2, 3 and 4 denote the ties. Secured to the ties 3 and 4, and extending from one to the other are a series of spacing beams 5, the ends of which that rest upon the tie 4 terminate in enlargements or spacing blocks 6, which are embraced by the U-shaped clamps or supports 7 and 7ª, between which the pickets 8 of the guard members 9 are pivoted upon the bolts 10. The bolts 10 are also mounted in the L-shaped brackets 7ª. The bolt which passes through the central picket guard member extends through each and every one of the spacing blocks 6 and U-shaped clamps or supports, while the bolts of the outer guard members only pass through the spacing blocks of the outer beams 5. The free ends of the pickets of each guard are connected together by the bolts 11, so that when each guard member is thrown upwardly, the pickets of the guards will move together. Extending through the beams 5 between the rails 1 is an elongated bolt 12, upon which the rocking bars 13 are pivoted. The ends 14 of the rocking bars are secured to a metallic bar 15, as at 16, which metallic bar 15 extends transversely of the rails, and upon which the guard members rest, when arranged in their normal positions. The metallic bar 15 is constructed with U-shaped portions 17, which arch under the rails, there being a sufficient amount of space between the lower portions of the U-shaped parts and the under face of the base of the rail, in order to allow the bar 15 to raise and lower.

The ends 18 of the rocking bars 13 are connected to the treadle 19. This treadle 19 comprises three sections or blocks 20, 21 and 22. The section or block 20 is disposed between the rails 1, while the sections or blocks 21 and 22 are arranged on the outer sides of the rails. The sections or blocks 20, 21 and 22 are connected by the plates 23, which are constructed with U-shaped portions 24 to arch under the rails, in the manner shown in the drawing. These plates 23 are reinforced relative to the blocks or sections 20, 21 and 22, by means of the braces 26.

An animal when attempting to cross the track will instantly throw the guard members upwardly, when treading upon either one of the sections or blocks of the treadle, thereby preventing him from crossing.

The foregoing sets forth and the drawing discloses an improved efficient cattle guard, and one which has been found practical.

The invention having been set forth, what is claimed as new and useful is:—

1. In combination, a pair of rail ties, a series of spacing beams connecting the ties, one end of each of which terminates in a spacing block, U-shaped clamps or supports embracing the spacing blocks, a guard member comprising pickets pivoted between the U-shaped clamps, and means extending through the spacing blocks, the U-shaped clamps and the pickets for pivoting the pickets, and treadle mechanism for actuating the guard member.

2. In combination, a pair of rail ties, a series of spacing beams connecting the ties, one end of each of which terminates in a spacing block, U-shaped clamps or supports embracing the spacing blocks, guard members comprising pickets pivoted between the U-shaped clamps, means extending through the U-shaped clamps and spacing blocks and the pickets for securing the pickets pivotally in place, a pivot bar extending through several of the spacing beams, rocking bars pivoted upon the pivot bar, a bar extending parallel with the length of the ties and adjacent one of said ties and connected to the rocking bars and on which the guard members rest, the bar having U-shaped portions adapted to arch down under the rails, and a pedal connected to the rocking bars, said pedal comprising three sections, plates connecting said sections and having U-shaped portions adapted to arch down under the rails, and braces for reinforcing said plates.

In testimony whereof I have signed my name to this specification in the presence of two subscribing witnesses.

MATHEW PHILEMON RAINEY.

Witnesses:
L. T. SAMMAUR,
C. D. WITHERSPOON.

Copies of this patent may be obtained for five cents each, by addressing the "Commissioner of Patents, Washington, D. C."